US011745093B2

(12) United States Patent
Platt et al.

(10) Patent No.: US 11,745,093 B2
(45) Date of Patent: *Sep. 5, 2023

(54) DEVELOPING IMPLICIT METADATA FOR DATA STORES

(71) Applicant: Microsoft Technology Licensing, LLC, Redmond, WA (US)

(72) Inventors: John C. Platt, Bellevue, WA (US); Surajit Chaudhuri, Redmond, WA (US); Lev Novik, Bellevue, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,509

(22) Filed: Nov. 23, 2021

(65) Prior Publication Data

US 2022/0152474 A1    May 19, 2022

Related U.S. Application Data

(63) Continuation of application No. 13/444,482, filed on Apr. 11, 2012, now Pat. No. 11,202,958.

(51) Int. Cl.
| | |
|---|---|
| *G06F 16/90* | (2019.01) |
| *A63F 13/20* | (2014.01) |
| *A63F 13/50* | (2014.01) |
| *G06F 16/907* | (2019.01) |

(52) U.S. Cl.
CPC ............ *A63F 13/20* (2014.09); *A63F 13/50* (2014.09); *G06F 16/907* (2019.01)

(58) Field of Classification Search
CPC .................................................. G06F 16/907
See application file for complete search history.

(56) References Cited

U.S. PATENT DOCUMENTS

| 8,126,887 | B2* | 2/2012 | Polo-Malouvier | G06Q 10/10 |
| | | | | 715/219 |
| 8,688,676 | B2* | 4/2014 | Rush | G06F 8/36 |
| | | | | 707/706 |
| 2007/0282804 | A1* | 12/2007 | Bowman | G06F 16/245 |
| 2012/0054216 | A1* | 3/2012 | Haahr | G06F 16/285 |
| | | | | 707/765 |
| 2012/0124143 | A1* | 5/2012 | Chung | G06Q 10/107 |
| | | | | 709/206 |

* cited by examiner

*Primary Examiner* — Kristopher Andersen
(74) *Attorney, Agent, or Firm* — Chin IP, PLLC

(57) ABSTRACT

A system enables metadata to be gathered about a data store beginning from the creation and generation of the data store, through subsequent use of the data store. This metadata can include keywords related to the data store and data appearing within the data store. Thus, keywords and other metadata can be generated without owner/creator intervention, with enough semantic meaning to make a discovery process associated with the data store much easier and efficient. Usage of or communication regarding a data store are monitored and keywords are extracted from the usage or communication. The keywords are then written to otherwise associated with metadata of the data store. During searching, keywords in the metadata are made available to be used to attempt to match query terms entered by a searcher.

20 Claims, 7 Drawing Sheets

DEVELOPING IMPLICIT METADATA FOR DATA STORES

CROSS-REFERENCE TO RELATED APPLICATION(S)

This application is a continuation of U.S. patent application Ser. No. 13/444,482, filed Apr. 11, 2012, entitled "DEVELOPING IMPLICIT METADATA FOR DATA STORES,". The entirety of this afore-mentioned application is incorporated herein by reference.

BACKGROUND

Data stores such as databases are starting to be treated as objects to be searched, where the searcher may not yet understand the schema or the data within the data store. Previously, data stores were made searchable by having the data store owner create a special query that produced a document to be indexed by a search engine. This presupposes that the owner cares enough to make his or her data store searchable, and that the searcher will know to use good and useful terms that will match the document in a meaningful way.

SUMMARY

This Summary is provided to introduce a selection of concepts in a simplified form that are further described below in the Detailed Description. This Summary is not intended to identify key features or essential features of the claimed subject matter.

Various embodiments provide a system that enables metadata to be gathered about a data store beginning from the creation and generation of the data store, and subsequent use of the data store. This metadata can include keywords related to the data store and data appearing within the data store. Thus, keywords and other metadata can be generated without owner/creator intervention, with enough semantic meaning to make a discovery process associated with the data store much easier and efficient.

In accordance with one or more embodiments, usage of or communication regarding a data store are monitored and keywords are extracted from the usage or communication. The keywords are then written to or otherwise associated with metadata of the data store. During searching, keywords in the metadata are made available to be used to attempt to match query terms entered by a searcher.

BRIEF DESCRIPTION OF THE DRAWINGS

The same numbers are used throughout the drawings to reference like features.

DETAILED DESCRIPTION

Overview

Various embodiments provide a system that enables metadata, here termed "implicit metadata" to be gathered about a data store beginning from the creation and generation of the data store, through subsequent use of the data store. This metadata can include keywords related to the data store and data appearing within the data store. Thus, keywords and other metadata can be generated without owner/creator intervention, with enough semantic meaning to make a discovery process associated with the data store much easier and efficient.

In accordance with one or more embodiments, usage of or communication regarding a data store are monitored and keywords are extracted from the usage or communication. The keywords are then written to or otherwise associated with metadata (i.e. implicit metadata) of the data store. During searching, keywords in the metadata or implicit metadata are made available to be used to attempt to match query terms entered by a searcher.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

EXAMPLE ENVIRONMENT

Figure 1:
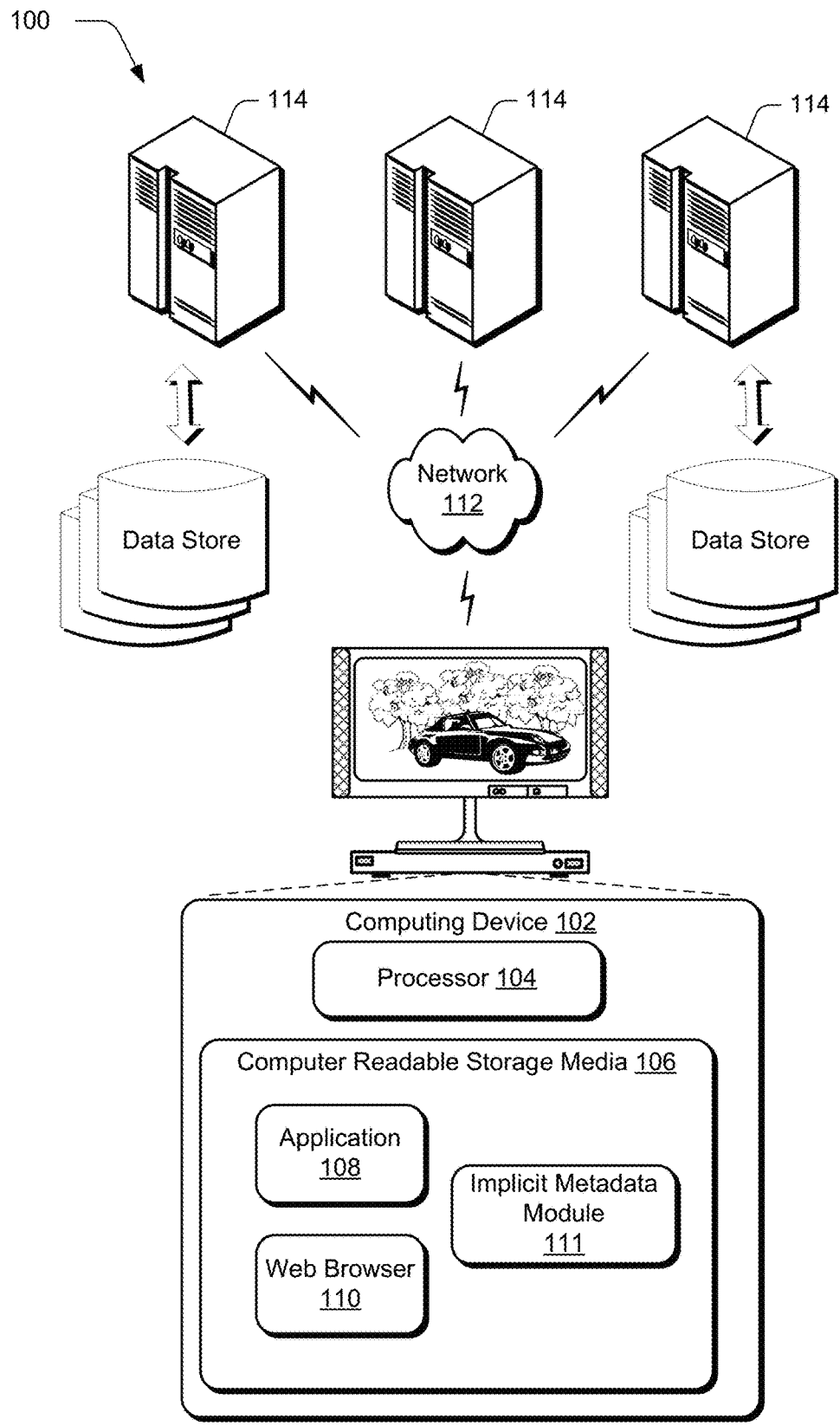
FIG. 1 illustrates an example operating environment in accordance with one or more embodiments.

FIG. 1 illustrates an operating environment in accordance with one or more embodiments, generally at 100. Environment 100 includes a computing device 102 in the form of a local client machine having one or more processors 104, one or more computer-readable storage media 106, one or more applications 108 that resides on the computer-readable storage media and which are executable by the processor 104. Computing device 102 also includes a web browser 110 and an implicit metadata module 111 that operates as described below. Module 111 can reside as a separate component that is utilized by applications 108 and web browser 110. Alternately, module 111 can be integrated with applications 108 and/or web browser 110.

Computing device 102 can be embodied as any suitable computing device such as, by way of example and not limitation, a desktop computer, a portable computer, a handheld computer such as a personal digital assistant (PDA), mobile phone, television, tablet computer, and the like. One of a variety of different examples of a computing device 102 is shown and described below in FIGS. 7 and 8.

Applications 108 can include any suitable type of applications. The web browser 110 is configured to navigate via the network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser may be configured to navigate via the network 112 to interact with content available from one or more servers 114, such as web servers, as well as communicate data to the one or more servers 114, e.g., perform downloads and uploads. The servers 114 may be configured to provide one or more services that are accessible via the network 112 and can include one or more data stores that maintain data (such as metadata and implicit metadata) that can be accessed by computing device 102. Examples of such services include map services, email, web pages, photo sharing sites, social networks, content sharing services, media streaming services, data retrieval and/or displaying services and so on.

One or more of the applications 108 may also be configured to access the network 112, e.g., directly themselves and/or through the browser. For example, one or more of the applications 108 may be configured to communicate messages, such as email, instant messages, and so on. In additional examples, an application 108, for instance, may be configured to access a social network, obtain weather updates, interact with a bookstore service implemented by one or more of the web servers 114, support word processing, provide spreadsheet functionality, support creation and output of presentations, and so on.

Thus, applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

Implicit metadata module 111 is representative of functionality that enables metadata, here termed "implicit metadata", to be gathered about a data store beginning from the creation and generation of the data store, throughout subsequent use of the data store. This metadata can include keywords related to the data store and data appearing within the data store. Thus, keywords and other metadata can be generated without owner/creator intervention, with enough semantic meaning to make a discovery process associated with the data store much easier and efficient.

In accordance with one or more embodiments, the implicit metadata module 111 enables usage of or communication regarding a data store to be monitored and for keywords or other information to be extracted from the usage or communication. The keywords or other information are then written to otherwise associated with metadata (i.e. implicit metadata) of the data store. During searching, keywords in the metadata or implicit metadata are made available to be used to attempt to match query terms entered by a searcher.

The implicit metadata can be developed by any suitable entity, such as a third party entity, and written to the appropriate data store. In typical scenarios, entities that develop implicit metadata are entities other than the creator or maintainer of the associated data store. Such entities can include, by way of example and not limitation, third party applications that execute on computing device 102 (or other computing devices such as servers and the like), third party software that executes on a computing device other than computing device 102, such as a server that routes or processes communication or usage data associated with a particular data store and the like.

In this manner, third party entities can create a collective, collaborative window into various data stores and their content that may not necessarily have been perceived by the creator or maintainer of the data store. By creating a collaborative window into various data stores, more robust and, in many cases, more granular information can be developed and utilized to enhance searching and consumption of the various data stores and their content. This can relieve data store creators and maintainers from having to perceive all of the manners in which their data stores can be viewed, semantically perceived, and/or consumed by those who consume the data stores and their content. This can, in turn, provide an on-going evolvable and updatable tool to greatly facilitate various consumption scenarios.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware or virtual machines of the computing device 102 to perform operations, e.g., processors, functional blocks, and so on. For example, the computing device 102 may include a computer-readable medium that may be configured to maintain instructions that cause the computing device, and more particularly the operating system and associated hardware of the computing device 102 to perform operations. Thus, the instructions function to configure the operating system and associated hardware to perform the operations and in this way result in transformation of the operating system and associated hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
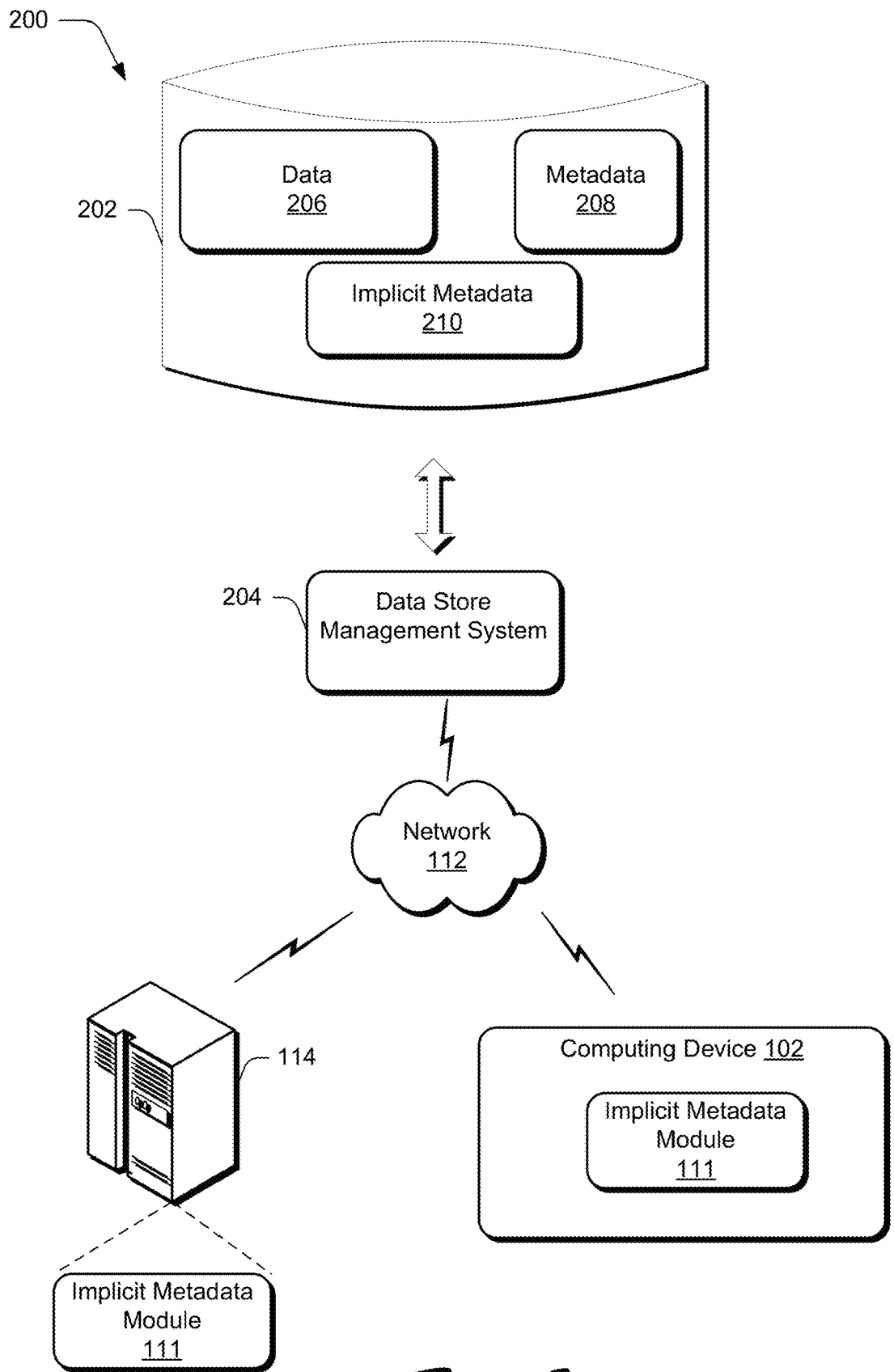
FIG. 2 illustrates an example operating environment in accordance with one or more embodiments.

FIG. 2 illustrates, generally at 200, a slightly different view of the operating environment of FIG. 1 wherein like numerals depict like components. In this example, environment 200 includes a data store 202 and a data store management system 204. The data store management system includes one or more computer-readable storage media and computer-readable instructions which implement data store management techniques to manage the data store and their associated data. As such, the data store management system 204 includes one or more software programs that control the organization, storage, management, and retrieval of data within the data store 202.

The data store includes data 206, metadata 208 associated with data 206 and implicit metadata 210 associated with data 206.

The metadata 208 can include any metadata that might be provided, for example, by the creator or maintainer of the data store.

The implicit metadata 210, different from metadata 208, can be developed and written into data store 202 by data store management system 204 using information that it receives from third-party entities by way of network 112. As noted above, implicit metadata 210 can be developed in a number of different ways including, by way of example and not limitation, computing device 102 and/or server 114, each of which can include an implicit metadata module 111 that operates as described above and below.

As background and in order to appreciate the various approaches in which implicit metadata can be developed, consider the following. In a typical corporate environment or data warehouse scenario, large numbers of data stores can be employed. Generally, users may wish to find a relevant data store out of the seemingly large number of data stores. To facilitate this, data store owners or creators can create a specific query such as a SQL query that runs on the data store to produce a document (i.e., metadata 208) that is then used by an internal search engine to create an index. This can be limiting, however, because keywords that a user may use to search for a particular data store may not be contained within the data store itself or creator-provided metadata 208. Hence, the document produced using the SQL query mentioned above will fail to include these keywords and thus, in many instances, limit data store accessibility for specific user queries. For example, a data store associated with a set of birdfeeders may not even contain the term "birdfeeder" but instead may simply have a set of keys or SKU strings that would not be comprehensible by a person unfamiliar with the particular data store schema.

In various embodiments, the implicit metadata module 111 can be utilized to add additional metadata or "implicit metadata" to the data store. Implicit metadata can be stored in any suitable way such as, by way of example and not limitation, as an additional table within the data store or as additional columns within a particular table or tables in the data store. The implicit metadata can be developed and populated using keywords and other information gathered from tools, such as software tools, that users utilize to create, transform, interact with, communicate about, or visualize data stores. As third parties use these tools, keywords or other information are generated about the data store that can then be used to conduct searches, as described below. Hence, the implicit metadata module 111 can develop keywords and other information and write these keywords and information into implicit metadata 210 that resides in the data store. The keywords or other information can be associated with an entire data store or with specific collections of data within a data store, such as specific tables and the like, depending on particular use scenarios.

When an internal search engine or other entity indexes the data store, the data store can provide the keywords or other information stored as implicit metadata to help describe itself to searchers. Accordingly, when a searcher types in a set of query terms, a search engine ranker can compare the keywords or other information in the implicit metadata 210 to the received query terms. This can allow relevant data stores to rank more highly within the returned results. Any suitable type of indexing and ranking approaches can be used, as will be appreciated by the skilled artisan.

Figure 3:
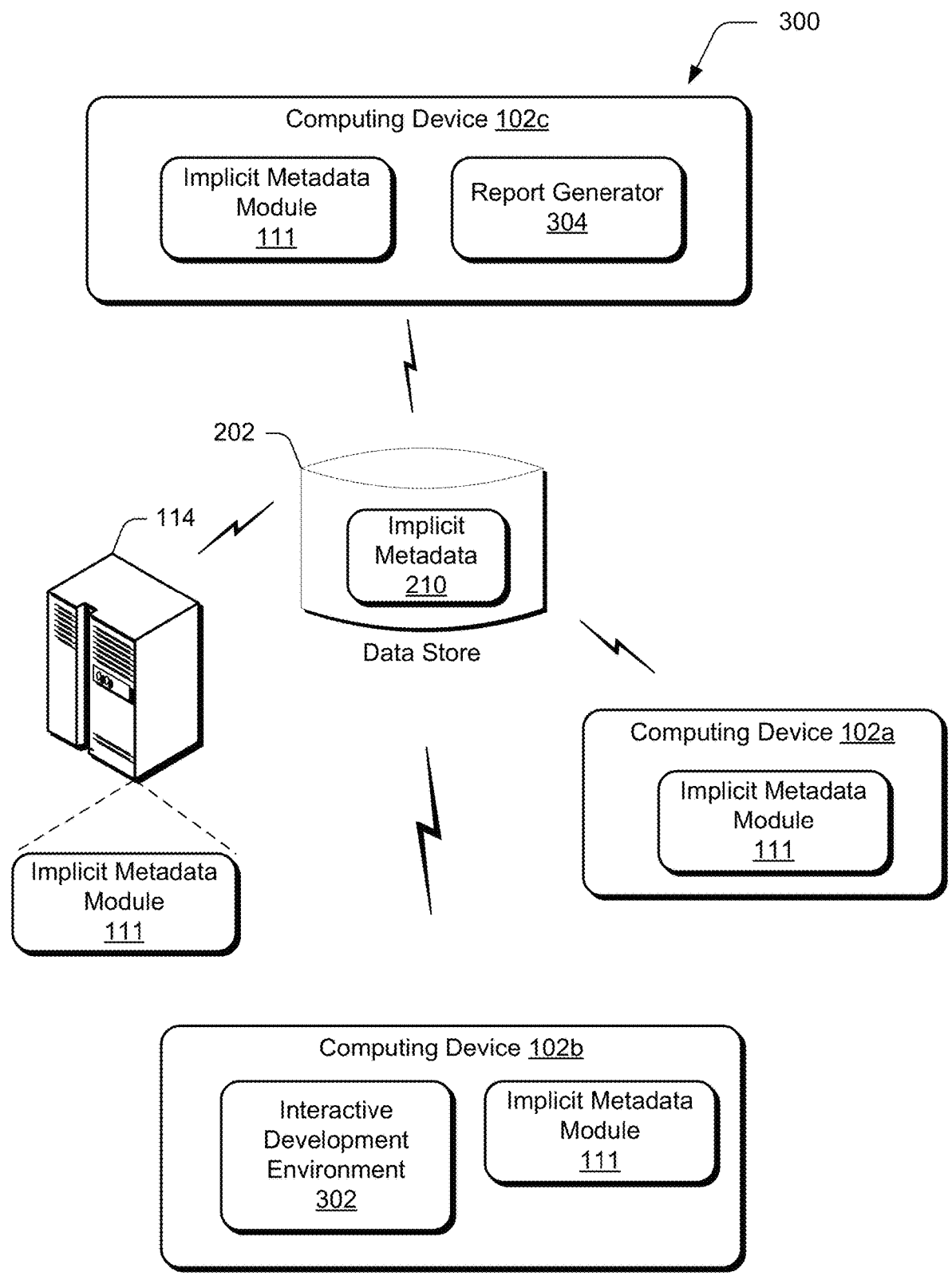
FIG. 3 illustrates an example operating environment in accordance with one or more embodiments.

FIG. 3 illustrates an environment, generally at 300, that shows multiple different computing devices including computing devices 102a, 102b, 102c, and server 114. Each of the computing devices includes an implicit metadata module 111 that operates as described above and below. It is to be appreciated and understood that any type of computing device can be utilized to develop implicit metadata that can then be written to data store 202.

In a general case, the computing device 102a includes an implicit metadata module 111. The metadata module 111 can be included in or otherwise used by any suitable type of application that can develop implicit metadata and/or be used by a third-party to interact with a particular data store. Such applications can utilize a particular data store, such as data store 202, and in the course of utilizing the data store and its data, can develop information associated with data usage (i.e. which data is used, how the data is used, use frequency and the like), communication pertaining to the data store, a user's interaction with data of the data store and the like. This information can then be communicated, by way of implicit metadata module 111, to data store 202 so that it can be written into the implicit metadata 210.

Computing device 102b illustrates a more specific case in which the computing device includes an interactive development environment 302. Typically, the interactive development environment 302 is utilized to enable a developer to produce code that generates or transforms data of data store 202, such as data that might appear in one of the data store's tables. In the course of interacting with data of the data store 202, the developer may include useful comments into their code. These comments may pertain to the type of data being utilized, the data's usefulness, how the data is being used, the expected result from data processing, data subsets that are to be produced from collections of data, and the like. In this instance, the implicit metadata module 111 can utilize an extraction module, such as a noun phrase extractor, to be applied to comments or other information appearing in the developer's code. The implicit metadata module 111 can then cause comments or other information (such as variable names to describe tables and the like), either directly or through the interactive development environment 302, to be written to the implicit metadata 210 within data store 202. In this instance, the third-party developer, through their consumption of the data store, can cause useful information to be associated with the data store which, in turn, can then be used in association with future searches to identify the data store or relevant data within the data store.

In addition, the implicit metadata 210 can also include information associated with the source of various pieces of the implicit metadata. In this instance, if the same code gets modified by the developer or subsequent developer, the implicit metadata module 111 and/or interactive development environment 302 can cause the implicit metadata 210 to be overwritten with the newly-developed implicit metadata.

As another specific use example, consider server 114 and its associated implicit metadata module 111. In this example, server 114 may reside in the form of an e-mail server or some other type of computing entity that processes communication associated with a particular data store. For example, assume that a user sends an e-mail pertaining to a particular data store in which the user comments favorably upon the data store or the data contained within the data store (e.g., "This data store was great for identifying utility and power consumption statistics of large corporations."). The e-mail might contain, for example, a report generated from the data store that is further described in the e-mail and/or the URI of the data store. When the e-mail is received, server 114 can utilize the implicit metadata module 111 to extract keywords or other information associated with a particular data store. For example, the implicit metadata module 111 can analyze the text of a particular e-mail and/or the content of any report or URI in order to generate keywords and other useful information (e.g., "utility and power consumption statistics", "utility statistics and large corporations", etc). The e-mail server, once identifying the particular data store of interest, can cause the keywords or other useful information to be written to implicit metadata 210 residing on data store 202. In some instances, the e-mail server 114 can query the e-mail sender as to whether it is permissible or not to use the keywords to be written into the implicit metadata 210.

Computing device 102c illustrates another specific use example. In this example, assume that a user utilizes a report generator 304 to generate a report from data store 202. Oftentimes reports can contain extra information added by an analyst to ensure that its data is more comprehensible. For example, an analyst may develop a chart from a particular query into the data store 202. The chart can contain titles, axis labels, embedded comments, and the like. Implicit metadata module 111 can extract keywords or other useful information from the titles, axis labels, embedded comments and the like and cause this information to be written to implicit metadata 210 on data store 202.

Having developed implicit metadata 210 from a variety of different sources other than the data store creator or maintainer, implicit metadata can be provided by the data store 202 to help describe itself. Now, when a future searcher provides a set of search terms or queries, a suitably-configured search engine ranker can compare the implicit metadata to the query terms. A set of results of relevant data stores can be returned which includes more highly ranked data stores based upon the implicit metadata.

In this manner, third parties are able to build a collective consciousness that pertains to content of a particular data store. The subsequently developed implicit metadata 210 can more accurately describe a data store and/or its data based on how the data store is used and perceived by the relevant using population. In doing so, future consumers of the data store can have a more relevant collection of tools available to help them find a particular data store or data of interest.

Having described an example environment and various use scenarios in which the techniques described herein may operate, consider now a discussion of some example methods in accordance with one or more embodiments.

EXAMPLE METHODS

Figure 4:
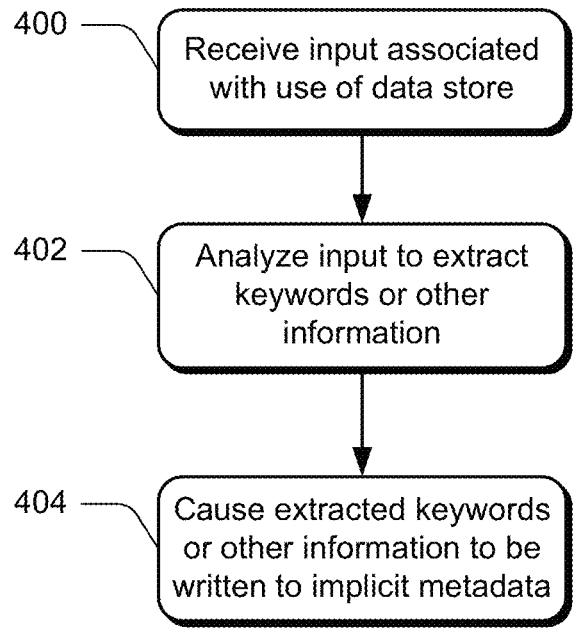
FIG. 4 is a flow diagram that describes steps in a method in accordance with one or more embodiments.

FIG. 4 is a flow diagram that describes steps a method in accordance with one or more embodiments. The method can be implemented in connection with any suitable hardware, software, firmware, or combination thereof. In at least some embodiments, the method can be implemented by a suitably-configured implicit metadata module such as the ones described above.

Step 400 receives input associated with use of a data store data store. Any suitable input associated with any suitable use can be received. In one or more embodiments, the input can be associated with an end user or end using entity that consumes or interacts with, in some manner, data associated with the data store. For example, use can include analyzing the data, preparing reports, charts, or other arrangements of the data for any suitable purpose, examples of which are provided above. Step 402 analyzes the input to extract keywords or other information. This step can be performed in any suitable way such as, by way of example and not limitation, analyzing the input and resulting use to extract keywords or other information. Examples of how this can be done are provided above. Step 404 causes extracted keywords or other information to be written to implicit metadata associated with the data store. In at least some embodiments, steps 400-404 can be performed by an entity other than the creator of the data store or the maintainer of the data store. This entity can be one that is unaffiliated with the creator or maintainer of the data store such as, for example, an end user.

Figure 5:
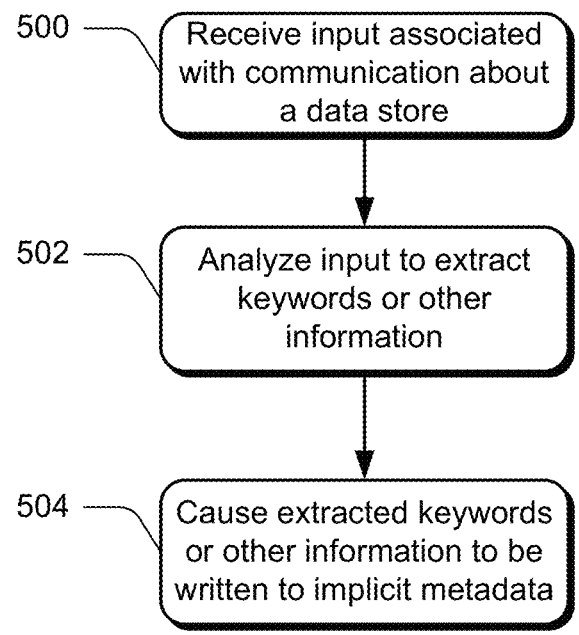
FIG. 5 is a flow diagram that describes steps in a method in accordance with one or more embodiments.

FIG. 5 is a flow diagram that describes steps a method in accordance with one or more embodiments. The method can be implemented in connection with any suitable hardware, software, firmware, or combination thereof. In at least some embodiments, the method can be implemented by a suitably-configured implicit metadata module such as the ones described above.

Step 500 receives input associated with communication about a data store. Any suitable input associated with any suitable communication can be received. In one or more embodiments, the input can be associated with a user who consumes or interacts with, in some manner, data associated with the data store and then communicates in some way about the data store. For example, use can include analyzing the data, preparing reports, charts, or other arrangements of the data for any suitable purpose, examples of which are provided above. The communication can include such things as electronic forms of communication such as e-mail communication, SMS communication, communication associated with a social network, a blog, peer-to-peer communication, and the like. Step 502 analyzes the input to extract keywords or other information. This step can be performed in any suitable way such as, by way of example and not limitation, analyzing the input and resulting communication to extract keywords or other information. Examples of how this can be done are provided above. Step 504 causes extracted keywords or other information to be written to implicit metadata associated with the data store. In at least some embodiments, steps 500-504 can be performed by an entity other than the creator of the data store or the maintainer of the data store. This entity can be one that is unaffiliated with the creator or maintainer of the data store such as, for example, an end user.

Having created implicit metadata as described in connection with FIGS. 4 and 5, the implicit metadata can now be made available by the data store to facilitate searches.

Figure 6:
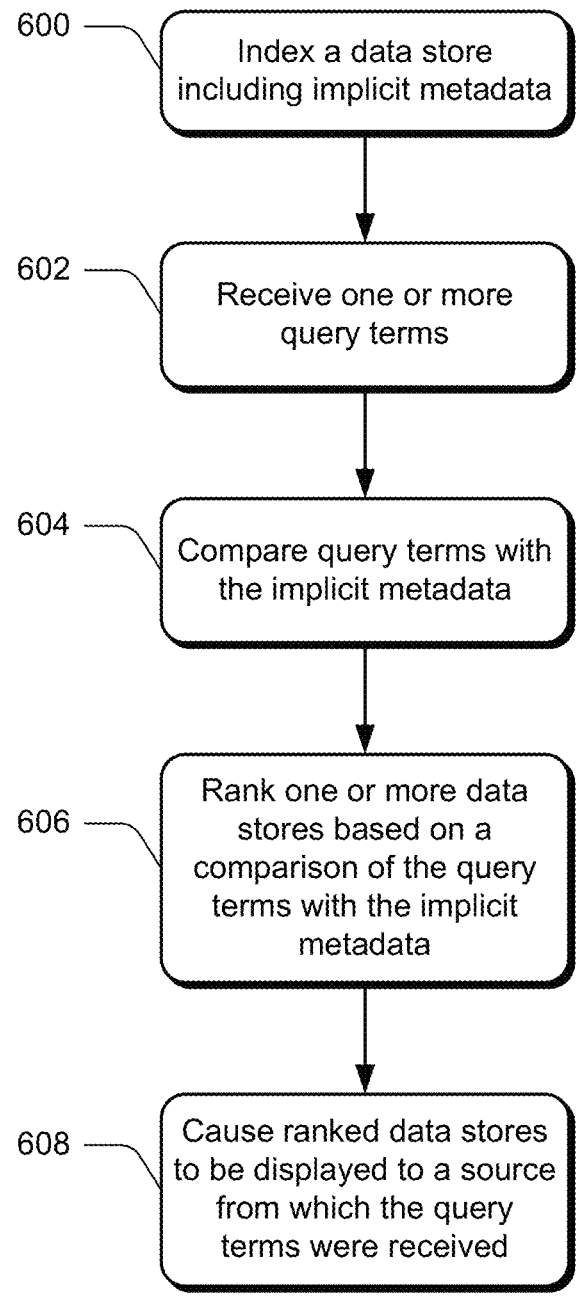
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, the method can be implemented by a suitably-configured data store management system, as described above.

Step 600 indexes a data store including implicit metadata. Examples of implicit metadata are provided above. As described above, the implicit metadata can include keywords and other information that are stored as a result of a user's interaction with or communication about the particular data store. Step 602 receives one or more query terms. These query terms can be received responsive to a user entering the query terms in a suitably-configured user interface. The query terms can be entered responsive to a user's desire to locate a particular relevant data store. Step 604 compares the query term or terms with the implicit metadata. Responsive to comparing the query terms, step 606 ranks one or more data stores based on a comparison of the query term or terms with the implicit metadata. Step 608 causes ranked data stores to be displayed to a source from which the query term or terms were received. The step can be performed by causing transmission of search results back to the source from which the query term or terms were received.

Once the search results are received, the user can select a particular data store that appears relevant to their search terms. In at least some embodiments, user feedback regarding the usefulness of the search results can further be used as a metric to rate the implicit metadata and its use in formulating the search results for a given set of query terms.

The above-described approach leverages implicit metadata that is provided by third-party entities other than a data store's creator or maintainer. As such, a more robust, tunable picture of the data store can be utilized for purposes of ascertaining data stores that are relevant to a user's query terms.

Having considered various embodiments, consider now an example system and device that can be utilized to implement the embodiments described above.

EXAMPLE SYSTEM AND DEVICE

Figure 7:
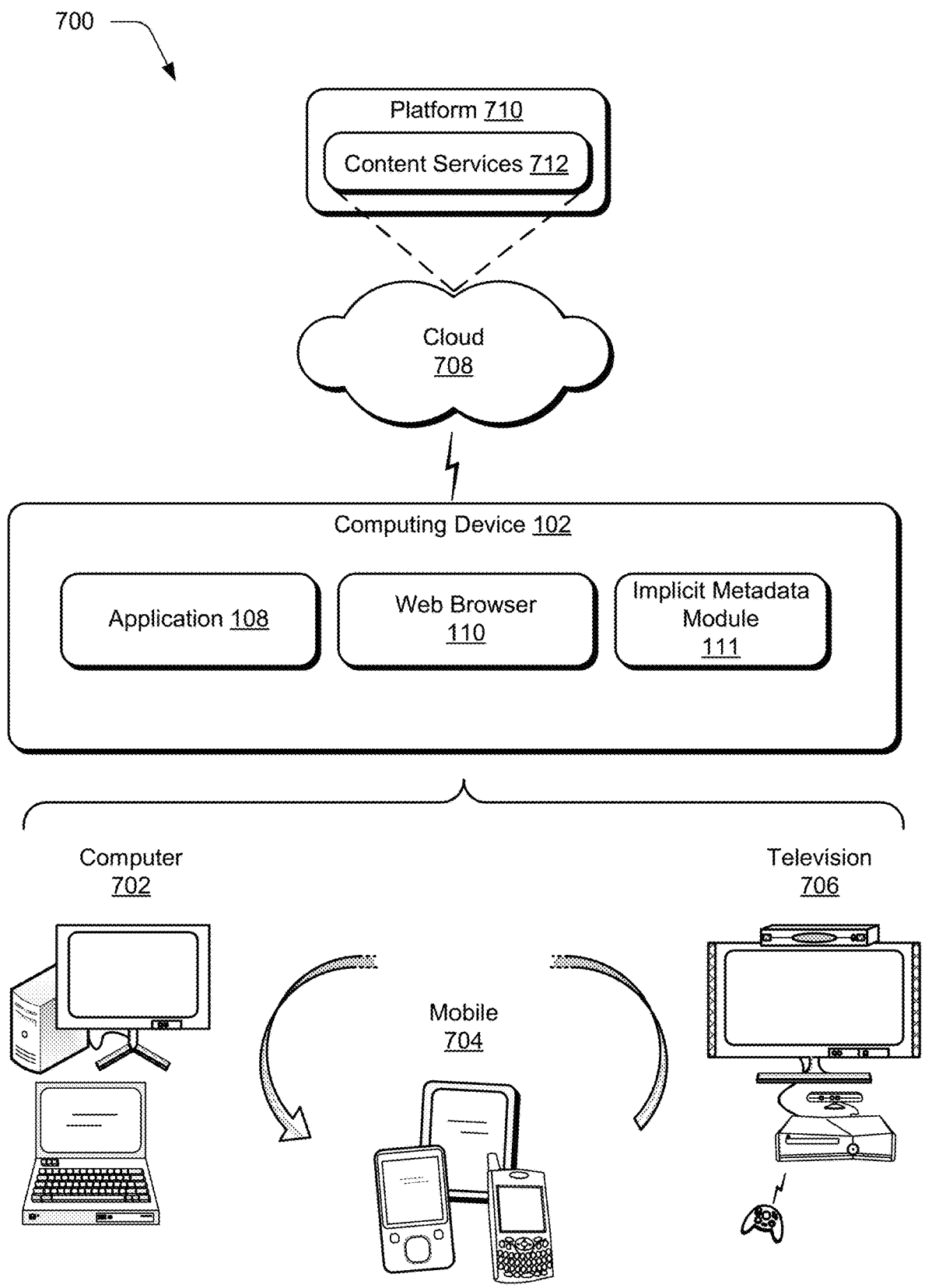
FIG. 7 illustrates an example system in accordance with one or more embodiments.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on. Each of these different configurations may employ the techniques described herein, as illustrated through inclusion of the application(s) 108, Web browser 110, and implicit metadata module 111.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality described herein may be distributed throughout the system 700. For example, the functionality may be implemented in part on the computing device 102 as well as via the platform 710 that abstracts the functionality of the cloud 708.

Figure 8:
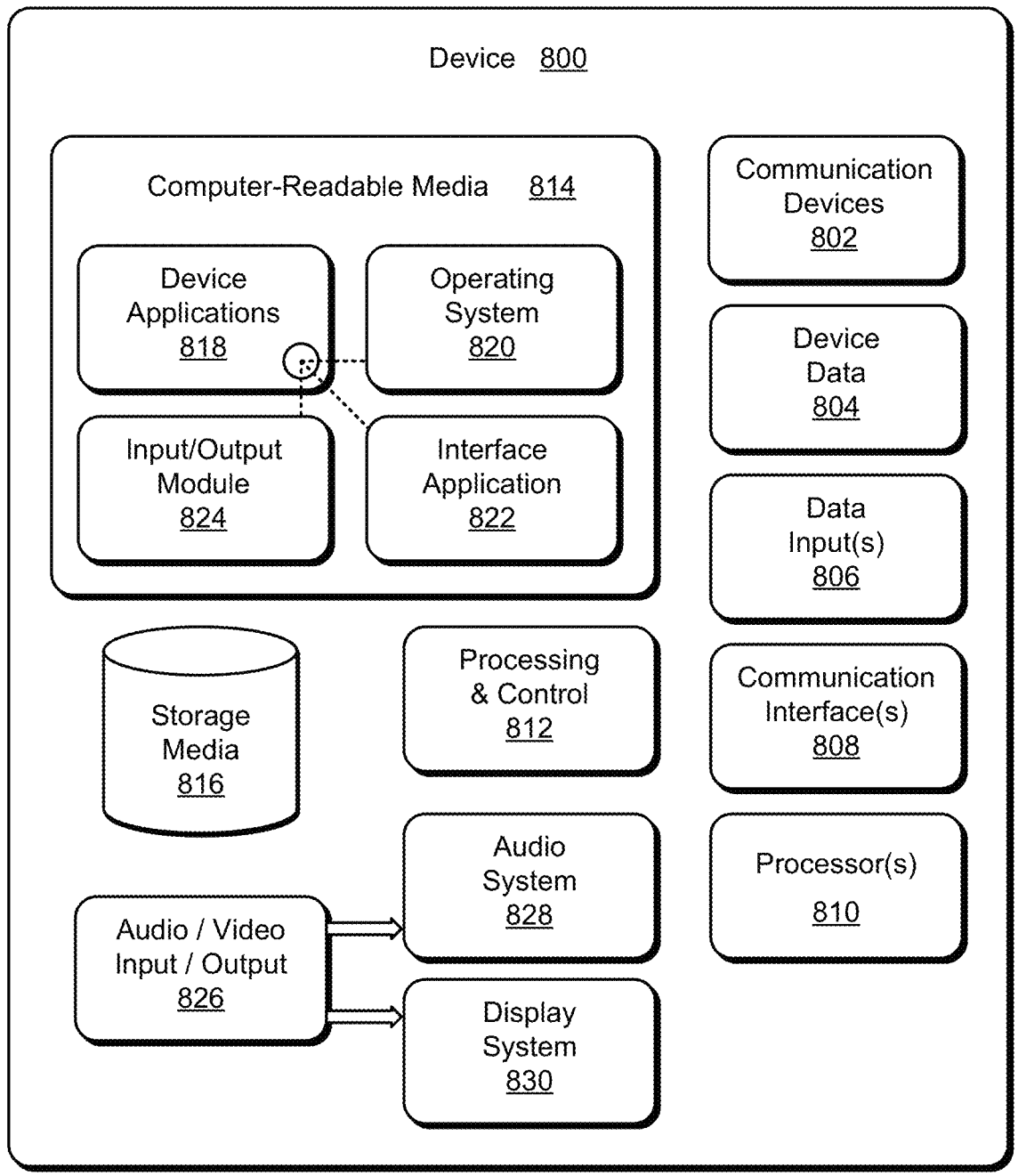
FIG. 8 illustrates an example device in accordance with one or more embodiments.

FIG. 8 illustrates various components of an example device 800 that can be implemented as any type of computing device as described above to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Various embodiments provide a system that enables metadata to be gathered about a data store beginning from the creation and generation of the data store, through subsequent use of the data store. This metadata can include keywords related to the data store and data appearing within the data store. Thus, keywords and other metadata can be generated without owner/creator intervention, with enough semantic meaning to make a discovery process associated with the data store much easier and efficient.

In accordance with one or more embodiments, usage of or communication regarding a data store are monitored and keywords are extracted from the usage or communication. The keywords are then written to otherwise associated with metadata of the data store. During searching, keywords in the metadata are made available to be used to attempt to match query terms entered by a searcher.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, from a source, input requesting usage of a database, wherein the source is different than the database, and wherein the database includes creator-provided metadata;
in response to the received input requesting usage of the database, generating implicit metadata regarding the database based on an analysis of the input requesting usage of the database, wherein the generated implicit metadata includes at least one keyword that is not contained in the database and that is not contained in the creator-provided metadata of the database;
adding, with a data store management system, the generated implicit metadata to the database, wherein the generated implicit metadata comprises at least one of data in the database or keywords related to the database; and
enabling the implicit metadata to be compared to query terms of a search of multiple databases including the database responsive to the search.

2. The computer-implemented method of claim 1, wherein the input requesting usage of the database is generated by an end using entity that is unaffiliated with the creator or maintainer of the database.

3. The computer-implemented method of claim 1, wherein the input requesting usage of the database is generated by an end using entity that is unaffiliated with the creator or maintainer of the database, the end using entity comprising a third-party application.

4. The computer-implemented method of claim 1, wherein the input requesting usage of the database is generated by an end using entity that is unaffiliated with the creator or maintainer of the database, the end using entity comprising a computing device other than an end user's computing device.

5. The computer-implemented method of claim 1, wherein the input requesting usage of the database is generated by an end using entity that is unaffiliated with the creator or maintainer of the database, the end using entity comprising a server.

6. The computer-implemented method of claim 1, wherein the adding includes writing the generated implicit metadata to a table within the database.

7. The computer-implemented method of claim 1, wherein the generated implicit metadata is associated with an entirety of the database.

8. The computer-implemented method of claim 1, wherein the generated implicit metadata is associated with a subset of the data within the database.

9. The computer-implemented method of claim 1, wherein the input requesting usage of the database is associated with an interactive development environment configured to be utilized to produce code that generates or transforms data of the database.

10. The computer-implemented method of claim 1, wherein the input requesting usage of the database is associated with an interactive development environment configured to be utilized to produce code that generates or transforms data of the database, and wherein at least some of the generated implicit metadata pertains to developer comments in said code.

11. The computer-implemented method of claim 1, wherein the generated implicit metadata is associated with the source different than the database.

12. The computer-implemented method of claim 1, wherein the generated implicit metadata pertains to keywords or other information extracted responsive to generation of a report from the database.

13. One or more computer readable storage media having computer readable instructions stored therein which, in response to execution, cause a computing device to perform operations, the operations comprising:
    receiving, from a source, a communication requesting usage of a database by the source, wherein the source is different than the database, and wherein the database includes creator-provided metadata;
    in response to the received communication requesting usage of the database, extracting implicit metadata regarding the database from the communication requesting usage of the database, wherein the implicit metadata includes at least one keyword that is not contained in the database and that is not contained in the creator-provided metadata of the database;
    via a data store management system, causing the storing of the extracted implicit metadata in the database, wherein the extracted implicit metadata comprises at least one of data stored in the database or keywords related to the database; and
    enabling the extracted implicit metadata to be compared to query terms of a search of multiple databases including the database responsive to the search.

14. The one or more computer readable storage media of claim 13, wherein the communication is associated with an end user's interaction with data of the database.

15. The one or more computer readable storage media of claim 13, wherein the communication comprises an e-mail communication.

16. The one or more computer readable storage media of claim 13, wherein the communication comprises a communication other than an e-mail communication.

17. The one or more computer readable storage media of claim 13, wherein the communication is associated with an additional source other than a creator or maintainer of the database.

18. A computing device, comprising:
    a memory and a processor that are respectively configured to store and execute instructions for causing the computing device to perform operations, the operations comprising:
        receiving, from a source, a communication requesting usage of a database by the source, wherein the source is different than the database, and wherein the database includes creator-provided metadata;
        in response to the received communication requesting usage of the database, extracting implicit metadata regarding the database from the communication requesting usage of the database, wherein the implicit metadata includes at least one keyword that is not contained in the database and that is not contained in the creator-provided metadata of the database;
        via a data store management system, causing the storing of the extracted implicit metadata in the database, wherein the extracted implicit metadata comprises at least one of data stored in the database or keywords related to the database; and
        enabling the extracted implicit metadata to be compared to query terms of a search of multiple databases including the database responsive to the search.

19. The computing device of claim 18, wherein the communication is associated with an end user's interaction with data of the database.

20. The computing device of claim 18, wherein the communication is associated with an additional source other than a creator or maintainer of the database.

* * * * *